United States Patent
Ide

(10) Patent No.: US 8,782,067 B2
(45) Date of Patent: Jul. 15, 2014

(54) SEARCHING METHOD, SEARCHING DEVICE AND RECORDING MEDIUM RECORDING A COMPUTER PROGRAM

(75) Inventor: Hiroyasu Ide, Hino (JP)

(73) Assignee: Casio Computer Co., Ltd, Tokyo (JP)

( * ) Notice: Subject to any disclaimer, the term of this patent is extended or adjusted under 35 U.S.C. 154(b) by 0 days.

(21) Appl. No.: 13/428,182

(22) Filed: Mar. 23, 2012

(65) Prior Publication Data

US 2012/0254209 A1     Oct. 4, 2012

(30) Foreign Application Priority Data

Mar. 30, 2011   (JP) .................................. 2011-074477

(51) Int. Cl.
    *G06F 17/30*   (2006.01)
(52) U.S. Cl.
    USPC ........... 707/758; 707/723; 707/728; 707/749; 707/769; 707/770
(58) Field of Classification Search
    USPC ......... 707/728, 731, 737, 748, 749, 723, 752, 707/754, 758, 769, 770
    See application file for complete search history.

(56) References Cited

U.S. PATENT DOCUMENTS

| | | | |
|---|---|---|---|
| 5,926,812 A * | 7/1999 | Hilsenrath et al. ............ | 707/737 |
| 7,930,309 B2 * | 4/2011 | Nagao ........................... | 707/758 |
| 8,073,831 B2 * | 12/2011 | Mitsuhashi .................... | 707/706 |
| 2003/0200211 A1 * | 10/2003 | Tada et al. .......................... | 707/5 |
| 2004/0103368 A1 * | 5/2004 | Liu et al. ......................... | 715/507 |
| 2007/0100818 A1 * | 5/2007 | DeFelice et al. ................... | 707/5 |
| 2008/0123963 A1 * | 5/2008 | Harada .......................... | 382/190 |
| 2009/0055354 A1 * | 2/2009 | Arad ................................. | 707/3 |
| 2010/0138434 A1 * | 6/2010 | Kawauchi ..................... | 707/758 |
| 2012/0078895 A1 * | 3/2012 | Chu-Carroll et al. ......... | 707/728 |
| 2012/0096341 A1 * | 4/2012 | Suga ............................ | 715/234 |
| 2012/0254209 A1 * | 10/2012 | Ide ................................ | 707/758 |

FOREIGN PATENT DOCUMENTS

| | | | |
|---|---|---|---|
| JP | 2006-106889 | | 4/2006 |
| JP | 2006106889 A | * | 4/2006 |
| JP | 2006106889 A2 | * | 4/2006 |

* cited by examiner

*Primary Examiner* — Hosain Alam
*Assistant Examiner* — Ahmed Abraham
(74) *Attorney, Agent, or Firm* — Amin, Turocy & Watson, LLP

(57) ABSTRACT

In a searching device, an extractor extracts extracted documents, each of which contains a desired search string, from a plurality of document groups each including a plurality of documents. A preference determiner determines an output preference for each of the extracted documents in accordance with a predetermined rule. A group determiner determines, in sequence for each of the plurality of document groups, whether or not the document group is a determined group which contains one or more satisfying documents among extracted documents satisfying a predetermined output condition. And, an outputter outputs, in sequence for each of the plurality of the determined groups, a predetermined number of the satisfying documents contained in the determined group.

18 Claims, 8 Drawing Sheets

SEARCHING METHOD, SEARCHING DEVICE AND RECORDING MEDIUM RECORDING A COMPUTER PROGRAM

CROSS-REFERENCE TO RELATED APPLICATION

This application claims the benefit of Japanese Patent Application No. 2011-074477, filed on Mar. 30, 2011, the entire disclosure of which is incorporated by reference herein.

FIELD

This application relates generally to a searching method, a searching device and a recording medium recording a computer program which are suitable for effectively presenting a search result from a plurality of document groups.

BACKGROUND

Conventionally, electronic dictionary devices (hereinafter, simply referred to as "electronic dictionaries") are known that are built with databases (dictionary DBs) of various dictionaries, such as a Japanese language dictionary, a Japanese-English dictionary, and an English-English dictionary. The dictionary DB collects information on a headword associated with explanatory information (e.g., character data, image data, motion-image data, and sound data) for explaining and illustrating the headword, and systematically organizes such information so that a computer can search such information.

The electronic dictionaries have various functions in order to enhance the user-friendliness of searching. In particular, according to electronic dictionaries built with DBs of a plurality of dictionaries, devising is done to enhance the usability such as making the selection of the dictionary by a user unnecessary by searching the plurality of dictionaries simultaneously.

For example, Unexamined Japanese Patent Application KOKAI Publication No. 2006-106889 discloses a technology of giving a preference depending on the level of a user to each dictionary in an electronic dictionary provided with a plurality of dictionary information, and of displaying a list of search results in the order of the preference. According to this technology, it becomes possible to provide an electronic dictionary with good user-friendliness that can preferentially present a search result from a dictionary depending on the level of the user (e.g., junior high school/high school/college).

According to the conventional technology disclosed in Unexamined Japanese Patent Application KOKAI Publication No. 2006-106889, however, even if searching is performed in a plurality of document groups (dictionaries), search results are not output from all over the document groups, and may be output from some document groups in an unbalanced manner. Hence, search results from the plurality of document groups are not effectively presented to the user.

This will be explained in more detail with an example electronic dictionary device built with a plurality of dictionary DBs. When searching is performed with a Japanese search string, Japanese search string is contained many times in explanatory information in a Japanese language dictionary more so than an English-English dictionary. Hence, even if searching is also performed in the English-English dictionary in practice, search results presented to the user are mostly derived from the Japanese language dictionary. Conversely, when searching is performed with an English search string, search results presented to the user are mostly derived from the English-English dictionary.

The present invention has been made to address such a technical issue, and it is an object of the present invention to provide a searching method, a searching device and a recording medium recording a computer program which are suitable for effectively presenting a search result from a plurality of document groups.

SUMMARY

To achieve the object, the present invention provides a searching method comprising: an extraction step of extracting extracted documents, each of which contains a desired search string, from a plurality of document groups each including a plurality of documents; a preference determination step of determining an output preference for each of the extracted documents in accordance with a predetermined rule; a group determination step of determining, in sequence for each of the plurality of document groups, whether or not the document group is a determined group which contains one or more satisfying documents among extracted documents satisfying a predetermined output condition; and an output step of outputting, in sequence for each of the plurality of the determined groups, a predetermined number of the satisfying documents contained in the determined group.

According to the present invention, it becomes possible to provide a searching method, a searching device and a recording medium recording a computer program suitable for effectively presenting a search result from a plurality of document groups.

BRIEF DESCRIPTION OF THE DRAWINGS

A more complete understanding of this application can be obtained when the following detailed description is considered in conjunction with the following drawings, in which.

DETAILED DESCRIPTION

An explanation will be given of an embodiment of the present invention with reference to the accompanying drawings. The embodiment explained below is for explanation and is not for limiting the scope and spirit of the present invention. Hence, those skilled in the art can carry out an embodiment in which the structural element to be discussed later is replaced with an equivalent and it should be understood that such an embodiment is also within the scope and spirit of the present invention. In the following explanation, the conventionally well-known technology not important to understand the present invention will be omitted accordingly.

According to the embodiment, a small information processing device having functions of electronic dictionaries, etc., will be explained as an information processing device that realizes a searching device. That is, a searching device of the embodiment searches document data containing a desired search string from a plurality of pieces of document data configuring an electronic dictionary.

Figure 1:
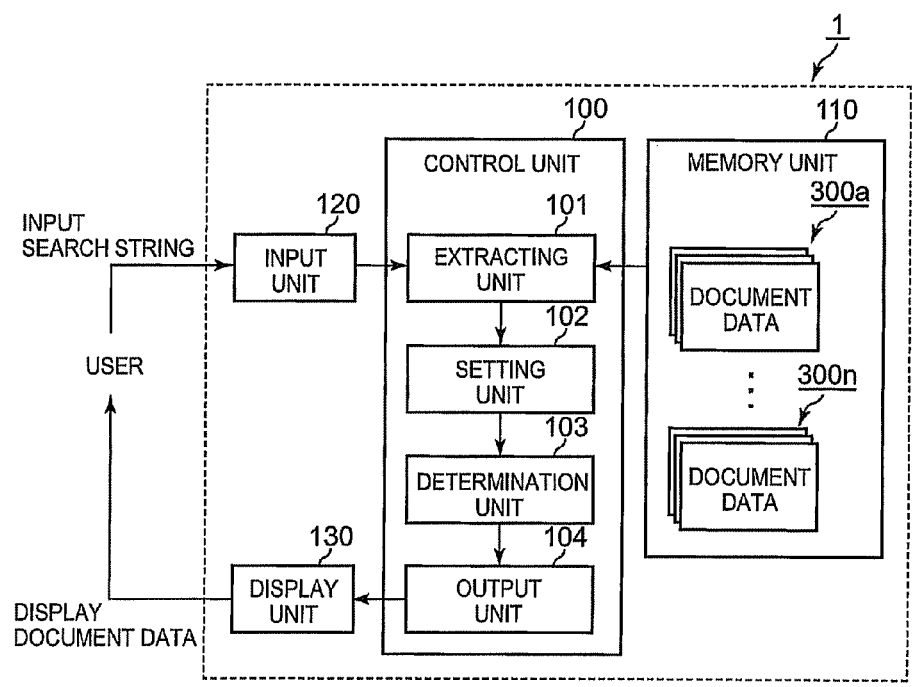
FIG. 1 is a diagram showing a general configuration of a searching device according to an embodiment of the present invention.
Figure 2:
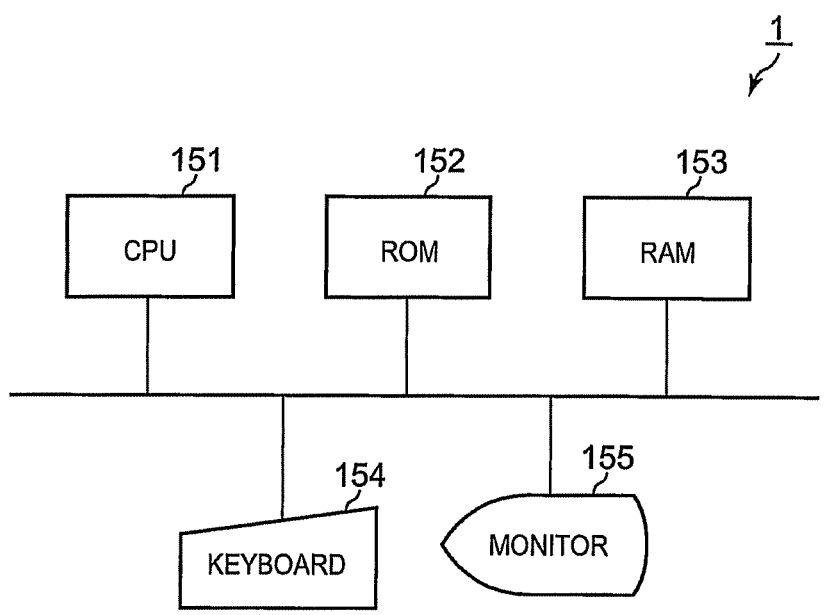
FIG. 2 is a diagram showing a physical configuration of the searching device according to the embodiment of the present invention.

Such a searching device 1 includes, as shown in FIG. 1, a control unit 100, a memory unit 110, an input unit 120, and a display unit 130. Conversely, the searching device 1 physically includes, as shown in FIG. 2, a CPU (Central Processing Unit) 151, a ROM (Read Only Memory) 152, a RAM (Random Access Memory) 153, a keyboard 154, and a monitor 155. Respective structural elements of the searching device 1 will be explained below with reference to FIGS. 1 and 2.

The control unit 100 is connected to individual structural elements of the searching device 1, and exchanges a control signal and data therewith to control individual structural elements. The control unit 100 is connected to the memory unit 110, the input unit 120, and the display unit 130, and executes a searching process to be discussed later while activating the functions of respective units.

The control unit 100 includes an extracting unit 101, a setting unit 102, a determination unit 103, and an output unit 104. As will be explained later in more detail, those units execute a process of specifying document data containing a desired search string from pieces of document data included in a plurality of document groups 300 (document groups 300a to 300n) stored in the memory unit 110, and outputting the specified document data in association with a predetermined output preference.

Such a control unit 100 (the extracting unit 101, the setting unit 102, the determination unit 103, and the output unit 104) is realized by, for example, the CPU 151. The CPU 151 is mutually connected to individual structural elements through a system bus that is a communication pathway for transmitting an instruction and data, and operates in accordance with a computer program and various data stored in the ROM 152 and necessary for the operation control of each structural element of the searching device 1 and an internal processing. The CPU 151 temporally stores the computer program and data read from the ROM 152 and data necessary for advancing other processes in the RAM 153, and controls respective operations. The CPU 151 works together with the ROM 152 and the RAM 153 as explained above, and thus the control unit 100 controls the operations of respective structural elements, thereby executing the searching process to be discussed later.

The memory unit 110 is realized by, for example, a read-only memory medium like the ROM 152 built in the searching device 1, and stores various data necessary for the searching process executed by the control unit 100. More specifically, the plurality of document groups 300 (the document group 300a to 300n) to be searched are stored in advance.

Figure 3A:
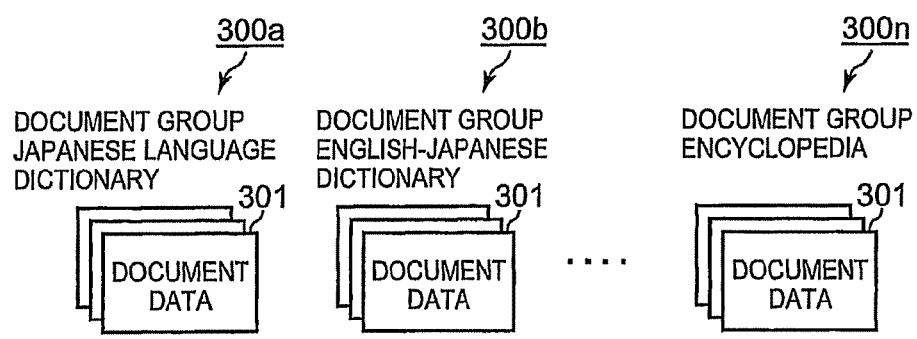
FIG. 3A is a diagram showing a plurality of document groups and a structure of document data according to the embodiment of the present invention.

The document groups 300a to 300n preliminarily stored in the memory unit 110 correspond to different kinds of dictionaries. More specifically, as shown in FIG. 3A, the document group 300a is a Japanese language dictionary, the document group 300b is an English-Japanese dictionary, and the document group 300n is an encyclopedia, and all are independent dictionaries from one another. That is, the searching device 1 has a plurality of kinds of such dictionaries, and performs searching within the plurality of kinds of dictionaries.

Figure 3B:
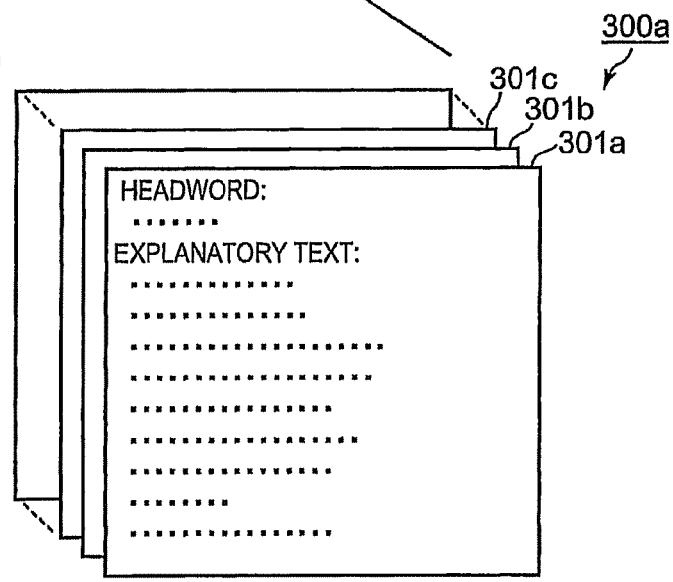
FIG. 3B is a diagram showing a plurality of document groups and a structure of document data according to the embodiment of the present invention.

Those document groups 300a to 300n each have a plurality of pieces of document data 301 as structural units of a dictionary. More specifically, as shown in FIG. 3B, the document group 300a that is the Japanese language dictionary includes a plurality of pieces of document data 301 (document data 301a to 301c, for example). Moreover, each of the document data 301 includes a "headword" and an "explanatory text". The "headword" is a phrase to be an index of the dictionary (entry word), and a headword is associated with a document data 301 (document to be searched). The "headword" is also associated with an "explanatory text" for explaining the headword. The combination of the "headword" and the "explanatory text" configures a document data 301. The document groups 300a to 300n include pieces of such document data 301 by what corresponds to the number of "headwords". All document data 301 (document data 301a to 301n) configure a document group 300.

Returning to FIGS. 1 and 2, the input unit 120 is an input device such as the keyboard 154, and receives an input given by a user. More specifically, the input unit 120 receives a search string from the user. The received search string is transmitted to the extracting unit 101 of the control unit 100, and is used for a process of extracting the document data 301 containing that search string.

The display unit 130 is realized by a display device such as the monitor 155, and presents a result of a process executed by the control unit 100 to the user. More specifically, the document data 301 containing the search string input by the user is displayed on the monitor 155 in accordance with a predetermined output preference to be discussed later, thereby presenting the process result to the user. Hence, the user can obtain the document data 301 containing the search string input by the user as an output result, and can utilize the obtained data for various purposes.

The input unit 120 and the display unit 130 may be realized by a combination of an input device and a display device such as a touch panel. In this case, a positional inputting device such as a touch sensor built in the touch panel serves as the input unit 120 and a display device such as a liquid crystal display serves as the display device 130.

Figure 4:
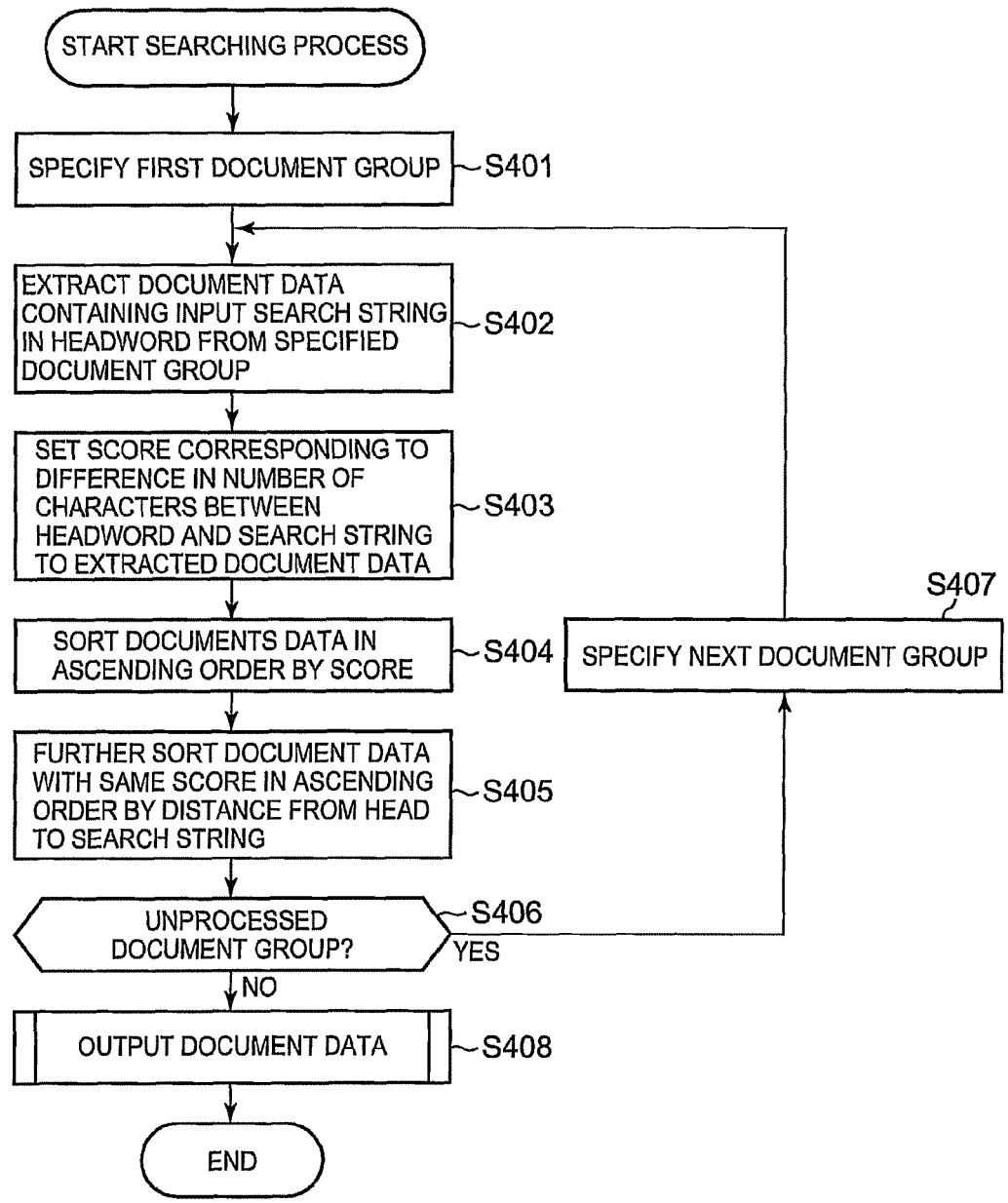
FIG. 4 is a flowchart showing a flow of a searching process by the searching device according to the embodiment of the present invention.

The control unit 100 of the searching device 1 employing the above-explained configuration executes the searching process using individual structural elements. More specifically, the process is executed through the procedures shown in FIG. 4.

This process is triggered upon reception by the input unit 120 of the searching device 1 of a search string input by the user. That is, when the user inputs a desired search string using the keyboard 154 and instructs searching, the process starts.

When the searching process starts, first, the extracting unit 101 of the searching device 1 specifies a first document group 300 (step S401). The first document group 300 means a first document group 300 among the plurality of document groups 300a to 300n stored in the memory unit 110 of the searching device 1 and arranged in a predetermined order. That is, the plurality of document groups 300a to 300n are set with predetermined orders beforehand, and information indicating such orders is stored in the memory unit 110. An extracting process and an output process, etc., are performed in accordance with the set order. In the following explanation, it is presumed that an order, such as the document group 300a is first, the document group 300*b* is next, and document group 300*n* follows, is set in advance to facilitate the understanding.

When the first document group 300*a* is specified, the extracting unit 101 extracts the document data 301 containing the input search string in the headword (extracted document) from the specified document group 300*a* (step S402). That is, the extracting unit 101 compares the character string of the input search string (a search character string) with respective character strings of the headwords of the plurality of pieces of document data 301 (the document data 301*a* to 301*n*) in the document group 300*a*, and extracts the document data 301 containing the character string matching the search string in the headword.

For example, when the user inputs a search string that is "mobile (AB)" (hereinafter, for an illustrative search string, respective character (for example, HIRAGANA characters or Chinese characters of Japanese) meaning that search string are allocated with symbols A to F and bracketed), the document data 301 having the headword exactly matching the phrase "mobile (AB)" or the document data 301 containing search character strings, such as "mobile phone (ABCD)" and "ubiquitous mobile (EFAB)", is extracted. When, for example, there are 10 pieces of document data 301 containing the headword including the input search string in the document group 300*a* containing, for example, 1000 pieces of document data 301, such 10 pieces of document data 301 are extracted.

The details of the searching performed at this time can be carried out based on the conventionally well-known searching technique. That is, the extracting unit 101 may perform sequential searching (grep searching) of successively scanning the character strings of respective headwords of the plurality of pieces of document data 301 (the document data 301*a* to 301*n*, for example), and finding the search character string, or may perform indexical (index type) searching having search files prepared in advance in order to speed up the search process.

When the document data 301 (extracted document) containing the search string in the headword is extracted in this manner, next, the setting unit 102 sets a score, which is a difference in the number of characters between the headword and the search string (difference between length of the headword and search string), to the pieces of extracted document data 301 (step S403). The "score" is an index indicating the output preference in an output process to be discussed later, and a value is set to a piece of extracted document data 301. That is, the process of outputting the pieces of document data 301 in accordance with the preference based on the set score is executed later.

At this time, the setting unit 102 obtains a difference in the number of characters between the headword and the search string, and sets such a difference as a value of the score. That is, the greater the difference in the number of characters between the headword and the search string is, the larger the value of the score becomes. Conversely, the smaller the difference is, the smaller the value of the score becomes. When the difference in the number of characters between the headword and the search string is small, it means that the matching level between the headword and the search string is high, and such document data 301 highly possibly matches the document data intended by the user. Hence, the output preference is set high so that the document data 301 with a smaller difference (score) is preferentially output. In other word, the score indicating output preference is determined base on the difference between length of the headword and length of the search string.

Figure 5:
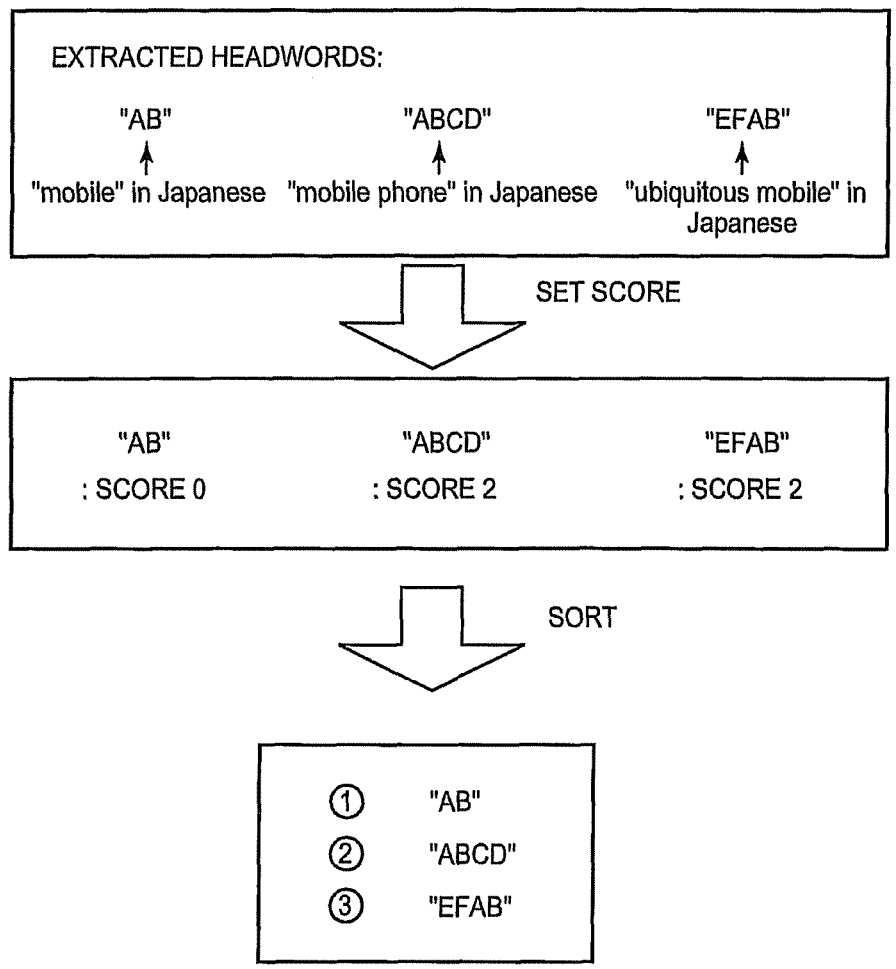
FIG. 5 is a diagram showing how scores are set to pieces of document data and the pieces of document data are sorted.

A detailed explanation will be given of an example case shown in FIG. 5. It is presumed that when the user inputs a search string "mobile (AB)", pieces of document data 301 are extracted which contain headwords that are "mobile (AB)", "mobile phone (ABCD)", and "ubiquitous mobile (EFAB)". The document data 301 having the headword that is exactly matching the phrase of "mobile (AB)" has no difference in the number of characters (zero character), and thus a score "0" is set. On the other hand, the document data 301 having the headwords "mobile phone (ABCD)" and "ubiquitous mobile (EFAB)" have a difference in the number of characters that is two characters, and thus a score "2" is set.

When the score is set in this fashion, the control unit 100 of the searching device 1 sorts the extracted document data 301 in the order of a smaller score (step S404). That is, pieces of extracted document data 301 are sorted in an order of a higher output preference. For example, the document data 301 with a headword "mobile (AB)" having a score that is zero is rearranged at a forward position than the document data 301 with headwords "mobile phone (ABCD)" and "ubiquitous mobile (EFAB)" having a score that is "2".

At this time, the control unit 100 further sorts the extracted document data 301 having the same score in an order of a closer position of the search string to the first character of the headword (step S405). That is, regarding the document data 301 sorted by the scores, the document data 301 having the same score are further sorted. As a basis of this rearrangement, the control unit 100 focuses on the position of the search string in the headword, and gives a preference to the closer one to the head of the headword. This is because it can be assumed that the document data with the search string located at the closer position to the head of the headword highly probable to match the document data 301 intended by the user.

This will be explained in more detail with reference to FIG. 5, and regarding the two pieces of document data 301 having the same score that is "2" and having a headword "mobile phone (ABCD)" and a headword "ubiquitous mobile (EFAB) ", respectively. The headword "mobile phone (ABCD)" has the letter string "mobile (AB)" of the search string located at the forward position than the headword "ubiquitous mobile (EFAB)", and such document data 301 is rearranged at the forward position. As a result, regarding the three pieces of extracted document data 301 having headwords "mobile (AB)", "mobile phone (ABCD)", and "ubiquitous mobile (EFAB)" that are extracted when the user inputs the search string "mobile (AB)", the document data 301 with the headword "mobile (AB)" having the smallest score that is "zero" is rearranged at the first position. The document data 301 with the headword "mobile phone (ABCD)" having a score that is 2 is rearranged at the second position. The document data 301 with the headword "ubiquitous mobile (EFAB)" having a score that is likewise 2 but containing the search string located not at the forward position is rearranged at the third position. In other word, preferences are determined for extracted documents having same score further based on the distances between a first character of the head word and the search string in the headword in an ascending order.

When both score and position of the search string are same, the pieces of extracted document data 301 are sorted in accordance with an alphabetical order of the headword in the document group 300, and other factors.

As explained above, the control unit 100 sets a score to each document data 301 extracted from the specified document group 300, and sort the pieces of extracted document data 301 by the score determined to the extracted document data 301 in ascending order. Next, the control unit 100 temporally stores the pieces of document data 301 in the RAM 153. Thereafter, the control unit 100 of the searching device 1 determined whether or not there is still an unprocessed document group 300 (step S406).

When there is still an unprocessed document group 300 (step S406: YES), a next document group 300 is specified (step S407), and the process returns to the step S402. That is, if this is after the processing of the document group 300*a*, the next document group 300*b* is specified, and extraction of the document data 301, setting of the score, and rearrangement are performed on the specified document group 300*b* through the steps S402 to S405. Those processes are performed on all of the document groups 300*a* to 300*n*, and the pieces of document data 301 containing the input search string are sorted by the score in the ascending order.

Figure 6:
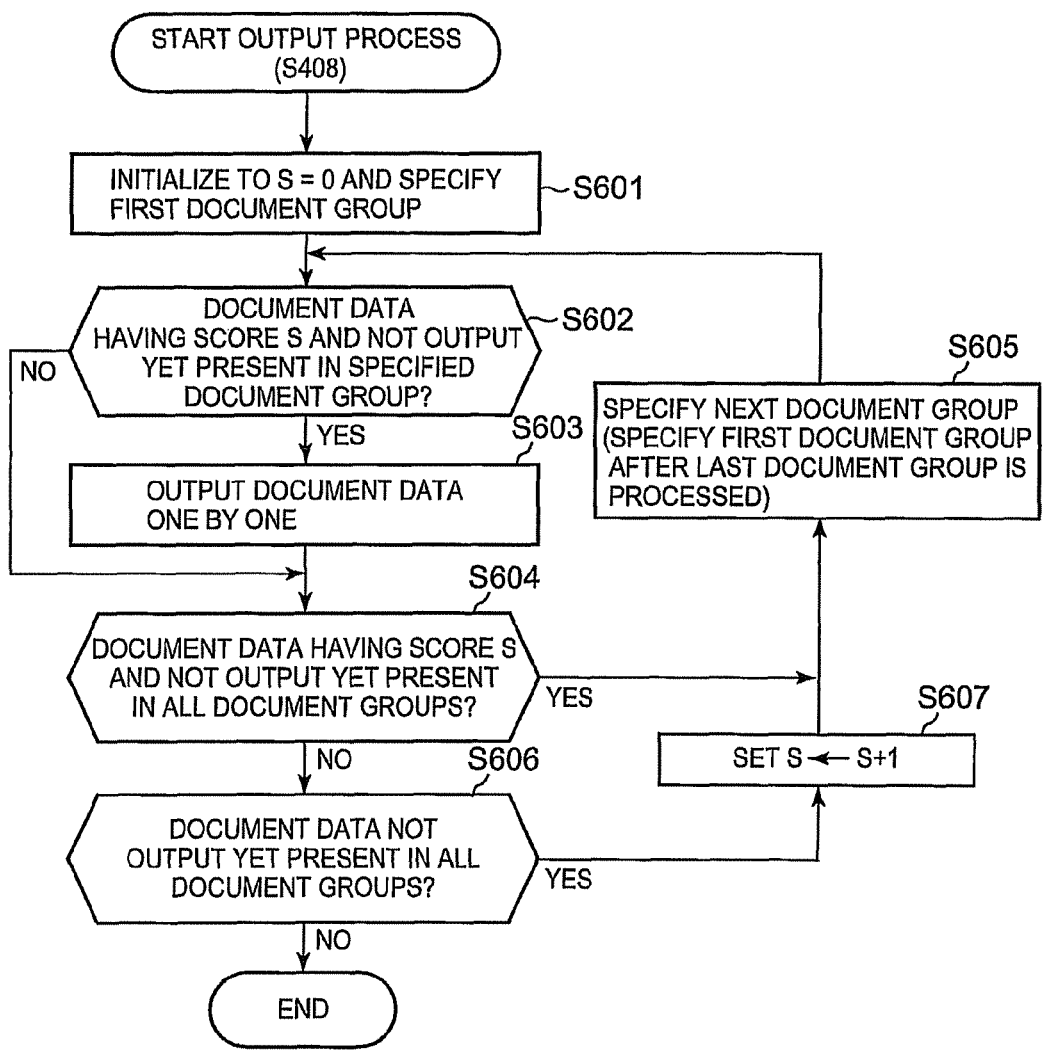
FIG. 6 is a flowchart showing a flow of an output process by the searching device according to the embodiment of the present invention.

Thereafter, when there is no unprocessed document group 300 left (step S406: NO), the process transitions to a process (step S408) of outputting the document data 301 based on the set score, i.e., the output preference. This output process will be explained in more detail later with reference to FIG. 6.

When the output process starts, the determination unit 103 of the searching device 1 initializes an output score S that is a determination criterion whether or not to output the document data 301 to "0". Moreover, the first document group 300 is specified (step S601). The first document group 300 is the first document group 300 stored in the above-explained predetermined order. More specifically, as shown in FIG. 7, when the three document groups 300*a* to 300*c* are stored in the order of, for example, the document group 300*a* that is the Japanese language dictionary, the document group 300*b* that is the English-Japanese dictionary, and the document group 300*c* that is an encyclopedia, the document group 300*a* that is the Japanese language dictionary is specified in the step S601.

Figure 7:
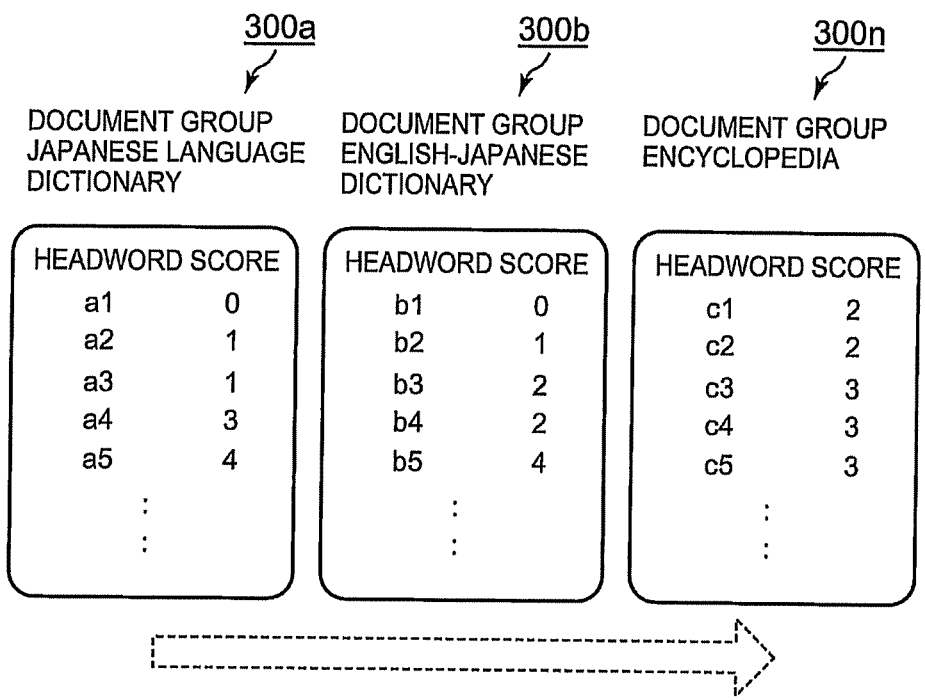
FIG. 7 is a diagram showing how pieces of document data are iteratively output from a plurality of document groups according to the embodiment of the present invention.

In the example case shown in FIG. 7, it is presumed that respective document groups 300*a* to 300*c* are already subjected to the processes from the step S402 to the step S405. That is, among the pieces of document data 301 of respective document groups 300*a* to 300*c*, the document data 301 containing the input search string are already extracted, a score is set to each document data 301, and those pieces of document data 301 are sorted by the score in ascending order. The explanation for the output process from this point will be given with reference to both flowchart of FIG. 6 and specific example of FIG. 7.

When the first document group 300*a* is specified, the determination unit 103 determines whether or not there is document data 301 which has a score S in the specified document group 300*a* and which is not output yet (step S602). When there is such document data 301 (step S602: YES), the output unit 104 outputs a piece of such document data 301 (step S603). Since the output score S is initialized to "0", the determination unit 104 determines whether or not there is document data 301 which has a score of "0" in the document group 300*a* and which is not output yet. When there is such document data, a piece of document data among those document data is output. The reason why all document data 301 having a score of "0" (the output preference is maximum) are not output simultaneously but only a piece of document data is output is that if a large number of document data 301 are output simultaneously, it becomes difficult to output the document data 301 in a balanced order as much as possible from the plurality of document groups 300*a* to 300*c*. Hence, the searching device 1 sets a predetermined number (in this embodiment, one) as a number of document data to be output at once, stores such a set number in the memory unit 110, etc., and causes the output unit 104 to output the predetermined number of document data 301 for each specified document group 300.

More specifically, in the example case shown in FIG. 7, a piece of document data 301 having a headword "a1" is present in the document group 300*a* as the document data 301 having a score set to "0". Hence, the output unit 104 displays the headword of document data 301 of "a1" on the monitor 155, etc., through the display unit 130 of the searching device 1, thereby outputting such data to the user.

Next, the determination unit 103 determines whether or not there is still document data 301 having a score S and not output yet in all document groups 300*a* to 300*c* (step S604). That is, it is determined whether or not there is still document data 301 having a score of "0" that is same as the output "a1" in the document group 300*a* including the other document groups 300.

When there is such document data 301 (step S604: YES), the next document group 300*b* is specified (step S605), and the process returns to the step S602. Next, the determination unit 103 determines whether or not there is target document data 301 in the specified document group 300*b*, and when there is such document data, the output unit 104 outputs in the step S603 a piece of target data 301.

More specifically, in the example case shown in FIG. 7, the document data 301 with a headword "b1" and having the same score as the output document data 301 with a headword "a1" is present in the specified document group 300*b* that is the English-Japanese dictionary. Accordingly, the output unit 104 outputs the document data 301 of "b1" following the document data 301 of "a1".

After the document data 301 of "b1" is output, there is no document data 301 being left in all document groups 300*a* to 300*c*, having a score of "0" and not output yet. Hence, in the flowchart of FIG. 6, it is determined that there is no document data 301 having a score of "0" and not output yet (step S604: NO). Next, the value of the output score is incremented by "1", i.e., the process is executed while the document data 301 with the maximum output preference is focused among the document data 301 not output yet.

In order to do so, first, the determination unit 103 determines whether or not there is still document data 301 not output yet in all document groups 300*a* to 300*c* (step S606). In this example, only the document data 301 having a score of "0" has been output and the document data 301 having a score of greater than or equal to "1" are not output yet, and thus it is determined that there is still document data 301 not output yet (step S606: YES). At this time, the value of the output score S is incremented to S+1, i.e., the score "0" is set to "1" (step S607), the next document group 300*c* is specified (step S605), and the process in the step S602 is executed again.

In this example, as shown in FIG. 7, most document data 301 contained in the specified document group 300*c* that is an encyclopedia have scores of equal to or greater than "2". Accordingly, the determination unit 103 determines in the step S602 in FIG. 6 that there is no document data 301 having the score set to "1" in the specified document group 300*c* (step S602: NO), and the process passes through the step S603, so that no document data 301 is output. The process directly progresses to the steps S604 and S605, the next document group 300*a* is specified, and the process returns to the step S602 again.

The document group 300*c* specified so far is the last group stored in the predetermined order, and in the step S605, the specifying rotation returns to the beginning of the predetermined order, and the document group 300*a* that is the Japanese language dictionary is specified next. It is determined whether or not there is still document data 301 having a score set to "1" and not output yet in the Japanese language dictionary that is the first document group 300a (step S602). More specifically, the first document group 300a contains the two pieces of document data 301 having a score of "1", not output yet, and having headwords "a2" and "a3". Hence, it is determined in this step that there is still document data not output yet, and the outputting process of the document data 301 in the step S603 is executed.

At this time, the output unit 104 outputs a predetermined number (1, in this case) of a piece of document data 301 between the two pieces of document data 301 ("a2" and "a3"). That is, the output unit 104 does not output the two pieces of document data 301 simultaneously, but outputs only a piece of document data 301 with the headword "a2" located at the forward position, and the process progresses to the next document group 300b that is the English-Japanese dictionary. Accordingly, a piece of document data 301 is output from each of the plurality of document groups 300a to 300c, and thus a balanced output as much as possible from the plurality of document groups 300a to 300c is enabled.

The above-explained processes are repeated and the output unit 104 of the searching device 1 iteratively specifies the document groups 300a to 300c, and outputs the document data 301 one by one in the order from smallest to largest. As a result, from the three document groups 300a to 300c shown in FIG. 7, the pieces of document data 301 are output in the order of "a1", "b1" "a2", "b2", "a3", "b3", "e1", "b4", "c2", "a4", "c3", "c4", "c5", "a5", "b5", etc.

According to such a configuration, the searching device 1 of this embodiment sets an output preference to the document data 301 based on a difference in the number of characters between a search string and a headword in searching of the document data 301 containing the desired search string from the plurality of document groups 300a to 300c, and iteratively outputs, for the plurality of document groups 300a to 300c, the document data 301 one by one in an order of a higher output preference.

As a result, the pieces of document data 301 containing the search string are output in a balanced manner from the plurality of document groups 300a to 300n, and the user can check the document data 301 highly probable to match the user's intent from each of the plurality of document groups 300a to 300c without explicitly specifying and searching any of the document groups 300. Moreover, the user can find such document data 301 while making a comparison, e.g., among the plurality of document groups 300a to 300n.

The above-explained embodiment is merely an example, and the present invention is not limited to such an embodiment. That is, the present invention can be changed and modified in various forms, and all of such forms are included within the scope and spirit of the present invention.

For example, according to the above-explained embodiment, the searching device 1 stores the document groups 300a to 300n in the memory unit 110 like the ROM 152. The present invention is, however, not limited to this configuration, and the searching device 1 may have a large-capacity memory device like a hard disk or a DVD-ROM drive, and may store the document groups 300a to 300n in the hard disk or the DVD-ROM, etc. Alternatively, the searching device 1 may be connected to a network, and the document groups 300a to 300n may be available over the network.

Figure 8:
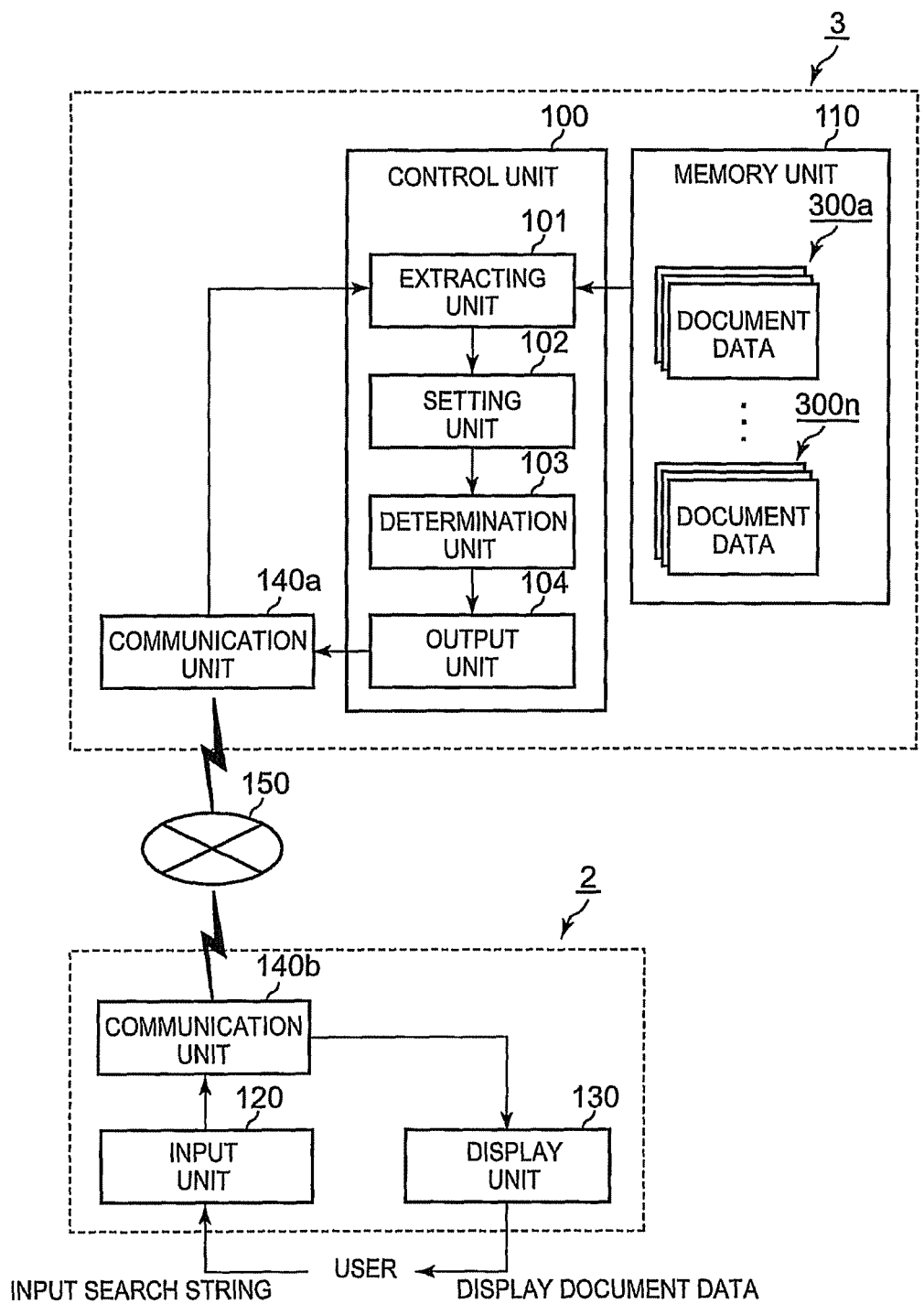
FIG. 8 is a diagram showing another illustrative general configuration of a searching device according to the present invention.

Moreover, according to the above-explained embodiment, the searching device 1 has the input unit 120 for allowing the user to input a search string and the display unit 130 for displaying a search result within the same device together with the control unit 100 and the memory unit 110. However, the present invention is not limited to this configuration, and the input unit 120 and the display unit 130 may be external devices of the searching device 1. That is, as illustrated in FIG. 8, a searching device 3 may be an information device like an on-line electronic dictionary having no input unit 120 and display unit 130 but connected to a terminal device 2 which has those units via a network 150.

At this time, the searching device 3 and the terminal device 2 have communication units 140a, 140b, respectively, to perform data communication therebetween over the network 150. That is, a search string input by the user from the terminal device 2 is transmitted to the searching device 3, and the control unit 100 executes the searching process. Thereafter, information on document data as a search result is transmitted to the terminal device 2 in association with the output order set for each document data, and is displayed to the user through the display unit 130. According to such a configuration, the document groups 300a to 300n, etc., in the searching device 3 can be comprehensively managed and available to plurality of users, and the terminal device 2 at the user's end does not need to have document groups 300a to 300n. Accordingly, there is an advantage such that the data size on the terminal device 2 can be maintained as small as possible.

Furthermore, according to the above-explained embodiment, the explanation was given of a case in which the searching device 1 is a compact information processing device like an electronic dictionary. The present invention is not limited to such a configuration, and the searching device 1 may be a business or home general computer apparatus or other information devices such as a mobile phone. That is, the searching device 1 may be a general-purpose computer configured to search document data 301 containing a desired search string from the document groups 300a to 300n prepared in a large-capacity memory device like a hard disk or a DVD-ROM, etc., or may be a mobile phone configured to search document data 301 containing the desired search string from the document groups 300a to 300n available over the network 150.

According to the above-explained embodiment, the searching device 1 extracts (i.e., a so-called "key word searching") the document data 301 containing the search string in the "headword", and outputs the extracted document data 301 in accordance with a predetermined rule based on the set output preference. However, the present invention is not limited to this configuration, and the document data 301 containing the search string in the "explanatory text" thereof may be extracted (i.e., a so-called "full-text searching"). That is, the search target can be expanded to both "headword" and "explanatory text", and the document data 301 containing the search string in at least either one of the headword and the explanatory text may be output to the user.

In this case, the document data 301 extracted through the "full-text searching" may have the output preference set to be lower than that of the document data 301 extracted through the "key word searching" (i.e., the score is set to be large). This makes it possible for the searching device 1 to preferentially output the document data 301 extracted on the basis of the "headword" and highly probable to match the document data 301 intended by the user without causing the user to explicitly specify whether to execute the searching through "key word searching" or "full-text searching". The document data 301 containing the search string in the "explanatory text" is output next, and thus the user can obtain the intended search result more conveniently.

In this case, a maximum value for the number of document data 301 to be output is set in advance, and when the number of document data 301 containing the search string in the "headword" does not reach the maximum value, the document data 301 containing the search string in the "explanatory text" may be extracted by what corresponds to the remaining number. In general, if the "explanatory text" is also included in the search target, the search range becomes broad. Accordingly, the search target is expanded to the "explanatory text" only when the number of document data to be output does not reach the maximum number, thereby reducing the load throughout the whole process.

According to the above-explained embodiment, the explanation was given of an example case in which a single search string is input from the user. The present invention is not limited to this case, and the searching device 1 may receive plurality of search strings, contrast a search query through various arithmetic processes, such as logical multiplication of plurality of search strings, and logical addition, and output the document data searched by the query based on the output preference set through a predetermined rule. In this case, the output preference set for the document data 301 extracted as a search result can be determined based on various appearing ways of such search strings, such as the appearing positions of the plurality of search strings in the document data 301, the appearance frequency of such search strings, or the interval of the appearance locations of the polarity of search strings.

According to the above-explained embodiment, the plurality of document data 301a to 301c, etc., contained in the document groups 300a to 300n are constituted by a "headword" and an "explanatory text". The present invention is, however, is not limited to this configuration, and the document data may further contain various elements. For example, the document data may contain a drawing, a table, etc., for explaining the "headword". Moreover, the structural units of the dictionary are not limited to only the "headword" and the "explanatory word", and the searching device 1 may search in various kinds of electronic data. For example, in a general computer apparatus, an electronic file containing a desired search character string may be searched from electronic files stored in a large-capacity memory device like a hard disk. Alternatively, the searching device 1 may be connected to a network, and search a web page available over the network.

According to the above-explained embodiment, the document groups 300a to 300n have a predetermined order set in advance, and the searching device 1 executes the process in accordance with the predetermined order. The present invention is not limited to an unchangeable order that is set in advance, and the predetermined order can be set and changed to various orders. For example, the use frequency for each document group 300 is stored in advance, and the predetermined order may be set in accordance with an order of a higher use frequency. Alternatively, the predetermined order can be set by the user. This makes it possible for the searching device 1 to output search results from the document groups 300 in sequence of higher probability of matching the user's intent, thereby improving the user-friendliness of the searching device 1.

It is not limited to search all document groups 300a to 300n stored in the memory unit 110, and the user may select the search-target document group 300. The search process may be executed on the selected document groups 300 based on a predetermined order. This enables an output of a search result further matching the user's intent According to the embodiment, the pieces of document data 301 contained in the plurality of document groups 300a to 300n are iteratively output one by one in the order of a higher output preference. The number of document data to be output is not limited to one, and may be output two by two, three by three, and in other numbers iteratively. That is, the set number of document data 301 to be output by the output unit 104 per a time is not limited to one, and may be any number. In general, if the predetermined number is a relatively small number like one or two, the document data 301 can be output in a well-balanced manner from all document groups 300. Conversely, if the predetermined number is increased, the pieces of document data 301 are output from each document group 300 in a cumulative number to some extent. Alternatively, the user may be allowed to set the number of document data 301 to be output per a timespan. This results in more flexible setting of the level of balancing of an output from the plurality of document groups 300a to 300n.

Although the present invention can be provided as a searching device having in advance the configuration of realizing the functions of the present invention, existing personal computer or information terminal device can function as the searching device of the present invention by applying a program thereto. That is, a searching program for realizing respective functions of the illustrative searching device 1 may be applied to existing personal computer or information terminal device so that a CPU, etc., controlling such computer or device can run the program, and thus such computer or device can function as the searching device 1 of the present invention. The searching method of the present invention can be executed using the searching device 1.

How to apply such a program is variable, and the program stored in a computer-readable memory medium, such as a CD-ROM, a DVD-ROM or a memory card may be applied or the program may be applied through a communication medium like the Internet.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A searching method comprising:
   an extraction step of extracting extracted documents, each of which contains a desired search string, from a plurality of documents which is included in each of a plurality of document groups in such a manner that, regarding at least one of the plurality of document groups, a plurality of documents is extracted from one document group;
   a preference determination step of determining output preferences, each of which is determined for each of the extracted documents including the plurality of documents extracted from the one document group, in accordance with a matching level between the search string and character strings in each of the extracted documents;
   an output preference specification step of specifying one of the output preferences determined at the preference determination step;
   a document group specification step of specifying one document group among the plurality of document groups;
   a document determination step of determining whether a document for which the output preference specified at the output preference specification step was determined is contained in the one document group specified at the document group specification step;
   an output step of outputting the document that was determined to be contained at the document determination step;
   a first repetition step of repeating the document group specification step, the document determination step and the output step while sequentially changing the one document group specified at the document group specification step, as long as another document for which the output preference specified at the output preference specification step was determined remains in any of the plurality of document groups, in a state of not being output; and a second repetition step of repeating the output preference specification step, the document group specification step, the document determination step, the output step and the first repetition step while changing the output preference specified at the output preference specification step one by one in an order from a highest preference to a lowest preference.

2. The searching method according to claim 1, wherein, the document group is specified at the document group specification step in a predetermined order determined to the plurality of document groups.

3. The searching method according to claim 2, wherein, the document includes a headword and an explanatory text which explains the headword; and, the preference determination step determines the output preference of the document based on a difference between a length of the headword and a length of the search string.

4. The searching method according to claim 3, wherein, the preference determination step determines the output preference, for each of the extracted documents having same difference between the length of the headword and the length of the search string, further based on a distance between a first character of the headword and the search string in an ascending order.

5. The searching method according to claim 4, wherein, the preference determination step determines a lower output preference to the extracted document not containing the search string in the headword than the extracted document containing the search string in the headword.

6. The searching method according to claim 5, wherein, the extraction step extracts, as the extracted document, the document containing the search string in the headword, and when a number of extracted documents does not reach a predetermined maximum number, further extracts the document containing the search string in the explanatory text.

7. A searching device comprising:

a memory that stores a plurality of document groups each including a plurality of documents; and a processor that executes an extraction step of extracting extracted documents, each of which contains a desired search string, from the plurality of documents included in each of the plurality of document groups stored in the memory in such a manner that, regarding at least one of the plurality of document groups, a plurality of documents is extracted from one document group, a preference determination step of determining output preferences, each of which is determined for each of the extracted documents including the plurality of documents extracted from the one document group, in accordance with a matching level between the search string and character strings in each of the extracted documents;

an output preference specification step of specifying one of the output preferences determined at the preference determination step;

a document group specification step of specifying one document group among the plurality of document groups;

a document determination step of determining whether a document for which the output preference specified at the output preference specification step was determined is contained in the one document group specified at the document group specification step, an output step of outputting the document that was determined to be contained at the document determination step, a first repetition step of repeating the document group specification step, the document determination step and the output step while sequentially changing the one document group specified at the document group specification step, as long as another document for which the output preference specified at the output preference specification step was determined remains in any of the plurality of document groups, in a state of not being output; and a second repetition step of repeating the output preference specification step, the document group specification step, the document determination step, the output step and the first repetition step while changing the output preference specified at the output preference specification step one by one in an order from a highest preference to a lowest preference.

8. The searching device according to claim 7, wherein, the document group is specified at the document group specification step in a predetermined order determined to the plurality of document groups.

9. The searching device according to claim 8, wherein, the document includes a headword and an explanatory text which explains the headword; and, the preference determination step determines the output preference of the document based on a difference between a length of the headword and a length of the search string.

10. The searching device according to claim 9, wherein, the preference determination step determines the output preference, for each of the extracted documents having same difference between the length of the headword and the length of the search string, further based on a distance between a first character of the headword and the search string in an ascending order.

11. The searching device according to claim 10, wherein, the preference determination step determines a lower output preference to the extracted document not containing the search string in the headword than the extracted document containing the search string in the headword.

12. The searching device according to claim 11, wherein, the extraction step extracts, as the extracted document, the document containing the search string in the headword, and when a number of extracted documents does not reach a predetermined maximum number, further extracts the document containing the search string in the explanatory text.

13. A non-transitory recording medium recording a computer program that allows a computer to execute:

an extraction step of extracting extracted documents, each of which contains a desired search string, from a plurality of documents which is included in each of a plurality of document groups in such a manner that, regarding at least one of the plurality of document groups, a plurality of documents is extracted from one document group, a preference determination step of determining output preferences, each of which is determined for each of the extracted documents including the plurality of documents extracted from the one document group, in accordance with a matching level between the search string and character strings in each of the extracted documents;

an output preference specification step of specifying one of the output preferences determined at the preference determination step;

a document group specification step of specifying one document group among the plurality of document groups;

a document determination step of determining whether a document for which the output preference specified at the output preference specification step was determined is contained in the one document group specified at the document group specification step, an output step of outputting the document that was determined to be contained at the document determination step, a first repetition step of repeating the document group specification step, the document determination step and the output step while sequentially changing the one document group specified at the document group specification step, as long as another document for which the output preference specified at the output preference specification step was determined remains in any of the plurality of document groups, in a state of not being output; and a second repetition step of repeating the output preference specification step, the document group specification step, the document determination step, the output step and the first repetition step while changing the output preference specified at the output preference specification step one by one in an order from a highest preference to a lowest preference.

14. The non-transitory recording medium recording the computer program according to claim 13, wherein, the document group is specified at the document group specification step in a predetermined order determined to the plurality of document groups.

15. The non-transitory recording medium recording the computer program according to claim 14, wherein, the document includes a headword and an explanatory text which explains the headword; and, the preference determination step determines the output preference of the document based on a difference between a length of the headword and a length of the search string.

16. The non-transitory recording medium recording the computer program according to claim 15, wherein, the preference determination step determines the output preference, for each of the extracted documents having same difference between the length of the headword and the length of the search string, further based on a distance between a first character of the headword and the search string in an ascending order.

17. The recording non-transitory medium recording the computer program according to claim 16, wherein, the preference determination step determines a lower output preference to the extracted document not containing the search string in the headword than the extracted document containing the search string in the headword.

18. The non-transitory recording medium recording the computer program according to claim 17, wherein, the extraction step extracts, as the extracted document, the document containing the search string in the headword, and when a number of extracted documents does not reach a predetermined maximum number, further extracts the document containing the search string in the explanatory text.

* * * * *